US012669778B2

(12) United States Patent
Hernandez et al.

(10) Patent No.: US 12,669,778 B2
(45) Date of Patent: Jun. 30, 2026

(54) SPIRAL SPRING FOR A HOROLOGICAL RESONATOR MECHANISM PROVIDED WITH MEANS FOR ADJUSTING THE STIFFNESS

(71) Applicant: Omega SA, Biel/Bienne (CH)

(72) Inventors: Ivan Hernandez, Cressier (CH); Romain Le Moal, Villers-le-lac (FR); Roberto Frosio, Chambrelien (CH); Pierre Cusin, Villars-Burquin (CH)

(73) Assignee: OMEGA SA, Biel/Bienne (CH)

( * ) Notice: Subject to any disclaimer, the term of this patent is extended or adjusted under 35 U.S.C. 154(b) by 249 days.

(21) Appl. No.: 18/472,436

(22) Filed: Sep. 22, 2023

(65) Prior Publication Data

US 2024/0126208 A1 Apr. 18, 2024

(30) Foreign Application Priority Data

Oct. 18, 2022 (EP) .................................... 22202272

(51) Int. Cl.
*G04B 17/06* (2006.01)
*G04B 18/04* (2006.01)

(52) U.S. Cl.
CPC ............. *G04B 17/06* (2013.01); *G04B 18/04* (2013.01)

(58) Field of Classification Search
CPC ...... G04B 17/06; G04B 18/04; G04B 18/023; G04B 17/066; G04B 17/34
See application file for complete search history.

(56) References Cited

U.S. PATENT DOCUMENTS

| | | | | |
|---|---|---|---|---|
| 2015/0234352 A1 | | 8/2015 | Hessler et al. | |
| 2016/0223989 A1 | * | 8/2016 | Winkler | G04B 17/08 |
| 2021/0389726 A1 | * | 12/2021 | Zaugg | G04B 17/32 |
| 2022/0171336 A1 | | 6/2022 | Kahrobaiyan | |

FOREIGN PATENT DOCUMENTS

| | | | | | |
|---|---|---|---|---|---|
| CH | 703 273 B1 | | 2/2015 | | |
| EP | 2138912 B1 | * | 7/2012 | G04B 17/066 |
| EP | 2 781 970 A1 | | 9/2014 | |
| EP | 2781969 A1 | * | 9/2014 | G04B 18/025 |
| EP | 4 009 115 A1 | | 6/2022 | |
| JP | 2015152604 A | * | 8/2015 | G04B 18/02 |
| JP | 2022-088332 A | | 6/2022 | |

OTHER PUBLICATIONS

EP-2781969-A1 Machine Translation from PE2E Search (Year: 2014).*
European Search Report for EP 22 20 2272 dated Feb. 1, 2023.

* cited by examiner

*Primary Examiner* — Regis J Betsch
*Assistant Examiner* — Kevin Andrew Johnston
(74) *Attorney, Agent, or Firm* — Sughrue Mion, PLLC

(57) ABSTRACT

A spiral spring for a horological resonator mechanism, including a flexible strip (2) coiled on itself into several turns The spring (1) including an element for adjusting its stiffness, which includes a first elongate flexible element (5), and a second elongate flexible element (15) arranged in series with the strip (2), each elongate flexible element (5) connecting the same end (4) of the strip (2) to a fixed support (11), so as to add an additional stiffness to the strip (2), each elongate flexible element (5) preferably having a stiffness higher than that of the strip (2). A prestressing element (6) applies at least two different adjustable efforts, the two efforts being applied on the first elongate flexible element (5) so as to make the stiffness of the first elongate flexible element (5) vary according to the prestress level.

19 Claims, 1 Drawing Sheet

SPIRAL SPRING FOR A HOROLOGICAL RESONATOR MECHANISM PROVIDED WITH MEANS FOR ADJUSTING THE STIFFNESS

CROSS REFERENCE TO RELATED APPLICATIONS

This application claims priority to European Patent Application No. 22202272.5 filed Oct. 18, 2022.

TECHNICAL FIELD OF THE INVENTION

The invention relates to a spiral spring for a horological resonator mechanism, the spiral spring being provided with means for setting the stiffness of said spiral spring. The invention also relates to a horological resonator mechanism provided with such a spiral spring.

TECHNOLOGICAL BACKGROUND

Most current mechanical watches are provided with a spiral balance and an escapement mechanism of the Swiss pallets type. The spiral balance forms the time base of the watch. This is also called resonator.

In turn, the escapement fills two main functions:

sustaining the reciprocating movements of the resonator;

counting these reciprocating movements.

To form a mechanical resonator, an inertial element, a guide and an elastic return element are necessary. Conventionally, a spiral spring serves as an elastic return element for the inertial element formed by a balance. This balance is rotatably guided by pivots which rotate in plain bearings made of ruby.

In general, the balance spiral spring should be able to be set to improve the accuracy of a watch. For this purpose, means for adjusting the stiffness of the spiral spring are used, such as an index for modifying the effective length of the spring. Thus, its rigidity is modified to adjust the accuracy of running of the watch. Nonetheless, the effectiveness of a conventional index for adjusting the running remains limited, and it is not always effective for making the setting accurate enough, in the range of a few seconds or a few tens of seconds per day.

For finer adjustment of running, there are setting means comprising one or more screw(s) arranged in the felloe of the balance. By acting on the screws, the inertia of the balance is modified, which results in modifying running thereof.

However, this setting method is not easy to perform, because it disturbs the equilibrium of the balance, and still does not allow obtaining enough fineness of setting of the running of the oscillator.

SUMMARY OF THE INVENTION

The present invention aims to overcome all or part of the aforementioned drawbacks, by providing a spiral spring provided with effective and accurate adjustment means, configured in particular to set running of a timepiece by modifying the effective stiffness of said spiral.

To this end, the invention relates to a spiral spring, in particular for a horological resonator mechanism, the spiral spring comprising a flexible strip coiled on itself into several turns, the strip having a predefined stiffness, the spiral spring including means for adjusting its stiffness.

The invention is remarkable in that the adjustment means include a first elongate flexible element, and a second elongate flexible element each arranged in series with the strip, each elongate flexible element connecting the same end of said strip to a fixed support, so as to add an additional stiffness to the strip, each elongate flexible element preferably having a stiffness higher than that of the strip, the adjustment means including prestressing means for applying at least two different adjustable efforts, the two efforts being applied on the first elongate flexible element so as to make the stiffness of the first elongate flexible element vary according to the prestress level.

Thanks to the invention, it is possible to modify the stiffness of at least one of the elongate flexible elements, such as flexible blades. Indeed, when two efforts such as those mentioned before are applied, the stiffness of the elongate flexible element is varied. Indeed, with one single effort applied, whether it is a force or a torque, the stiffness of the elongate flexible element remains the same. With two perpendicular forces on one blade, longitudinally and orthogonally, an overall force is obtained, which makes the stiffness of the elongate flexible element vary. The combination of two efforts being essential to be able to do so.

By acting on the prestressing means, the intensity level of the load is modulated, which results in a modification of the stiffness of the set comprising the flexible elements and the strip. Indeed, the flexible element set in series with the strip brings in an additional stiffness, which combines with that of the strip. Thus, when the prestressing means apply variable efforts on at least one of the elongate flexible elements, they modify the stiffness of the flexible element and therefore of the set comprising the strip and the flexible elements without modifying the stiffness of the strip, regardless of the variable forces applied on the elongate flexible element.

In other words, a flexible element is placed in series with the strip between one end of the strip and the fixed support. This flexible element brings in an adjustable additional stiffness between the strip and the attach point of the strip, and confers more flexibility on the resonator. Thus, the effective stiffness of the resonator comprises the stiffness of the strip and the stiffness of the flexible element. The variable efforts for prestressing the flexible element are applied, without prestressing the strip. By prestressing the flexible element, its stiffness changes, whereas the stiffness of the strip remains substantially unchanged. By changing the stiffness of the flexible element, the stiffness of the resonator (stiffness of the strip and stiffness of the flexible element) changes, which consequently modify running of the resonator.

Consequently, a modification of the rigidity of the flexible element modifies the rigidity of the entire resonator, and consequently finely sets running thereof, which allows accurately adjusting the frequency of our time base. Thus, a great accuracy in setting of the running is obtained, because one single additional element is finely acted upon to adjust the rigidity of the spiral spring.

According to a particular embodiment of the invention, the first effort is imparted by a first tensile/compressive force directed substantially in the longitudinal direction $F_L$ of the first elongate flexible element.

According to a particular embodiment of the invention, the first effort further exerts a first force directed substantially in a direction substantially orthogonal $F_T$ to the longitudinal direction of the second elongate flexible element.

According to a particular embodiment of the invention, the second effort is imparted by a second force directed substantially in a direction substantially orthogonal $F_T$ to the longitudinal direction of the first elongate flexible element.

According to a particular embodiment of the invention, the second effort further exerts a second tensile/compressive force directed substantially in the longitudinal direction $F_L$ of the second elongate flexible element.

According to a particular embodiment of the invention, each of the first and second elongate flexible elements includes a unique flexible blade.

According to a particular embodiment of the invention, each of the first and second elongate flexible elements includes a pair of main flexible blades.

According to a particular embodiment of the invention, the first flexible element is arranged in a radial direction of the spiral spring.

According to a particular embodiment of the invention, the second flexible element is arranged in a direction tangential to the spiral spring.

According to a particular embodiment of the invention, the first and second elongate flexible elements are substantially perpendicular to one another.

According to a particular embodiment of the invention, the prestressing means comprise two secondary flexible blades connected at the end, each secondary flexible blade being arranged in line with one of the elongate flexible elements.

According to a particular embodiment of the invention, the prestressing means include two rigid bodies each arranged at the end of each secondary flexible blade.

According to a particular embodiment of the invention, the prestressing means include variable support means on each rigid body.

According to a particular embodiment of the invention, the efforts are continuously adjustable by the prestressing means.

According to a particular embodiment of the invention, the first and second flexible elements are arranged at an outer end of the strip.

According to a particular embodiment of the invention, the end of the strip comprises an appendix, the prestressing means and the elongate flexible elements being attached to the appendix.

According to a particular embodiment of the invention, the end of the strip is more rigid than the elongate flexible elements and the strip.

According to a particular embodiment of the invention, the elongate flexible elements comprise a flexible neck.

According to a particular embodiment of the invention, the prestressing means are configured to enable an adjustment of the two efforts at different intensities.

The invention also relates to a rotary resonator mechanism, in particular for a horological movement, including an oscillating mass and such a spiral spring.

BRIEF DESCRIPTION OF THE FIGURES

The aims, advantages and features of the present invention will appear upon reading several embodiments given only as non-limiting examples, with reference to the appended drawings wherein.

DETAILED DESCRIPTION OF THE INVENTION

Figure 1:
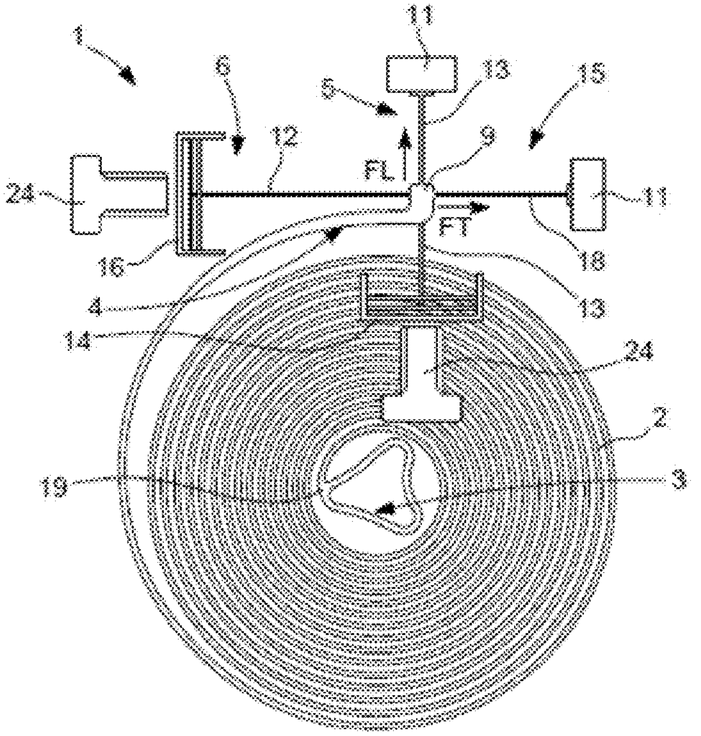
FIG. 1 schematically shows a top view of a spiral spring according to a first embodiment of the invention, and FIG. 2 schematically shows a top view of a spiral spring according to a second embodiment of the invention.
Figure 2:
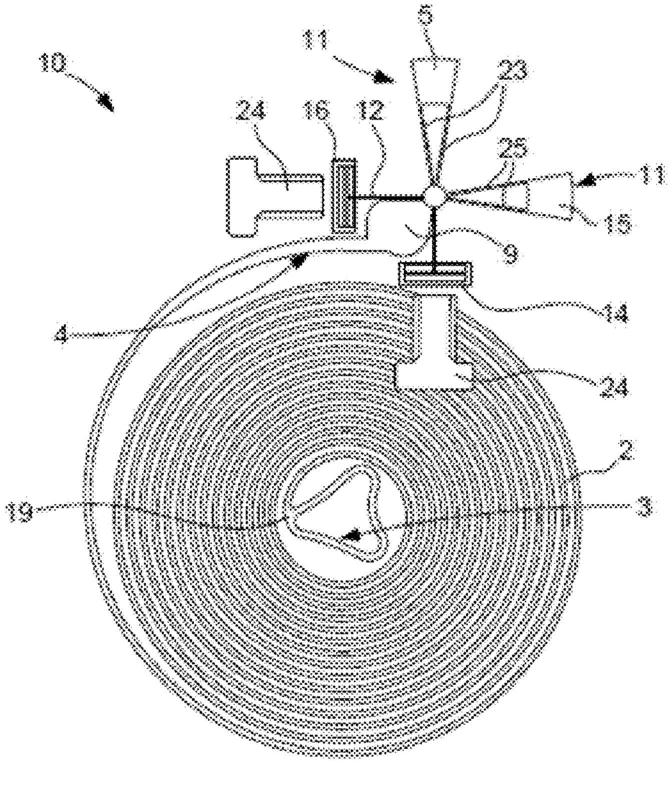

Each of FIGS. 1 and 2 shows a schematic illustration of a different embodiment of a spiral spring 1, 10, in particular for a horological resonator mechanism. In this case, the spiral spring extends substantially in the same plane. The spiral spring 1, 10 comprises a flexible strip 2 coiled on itself into several turns, the strip 2 having a predefined stiffness. The spiral spring 1, 10 includes means for adjusting its stiffness. For example, the adjustment means can in particular be actuated when the spiral spring 1, 10 is mounted on a plate of a horological movement, not shown in the figures.

According to the invention, the adjustment means include first 5 and second 15 elongate flexible elements extending longitudinally. Each flexible element 5, 15 is arranged in series with the strip 2, the first 5 and second 15 flexible elements connect the same end 4 of said strip 2 to a fixed support 11, 14. In other words, the strip 2 is connected to the fixed support 11, 14 only by these flexible elements 5, 15.

The flexible elements 5, 15 are secured to one of the ends 4 of the strip 2. Preferably, the two flexible elements 5, 15 are arranged perpendicularly to one another.

The embodiments described hereinbelow comprise flexible elements 5, 15 secured to the outer end 4 of the strip 2. The inner end 19 of the strip 2 is intended to be assembled to a support 3 of an oscillating mass of the resonator 1.

The flexible elements 5, 15 add additional stiffness to that of the strip 2. Preferably, the flexible elements 5, 15 have a stiffness greater than that of the strip 2. The first flexible element 5 is herein arranged in line with the strip 2, whereas the second flexible element 15 is arranged perpendicularly to the first flexible element 5. Preferably, the adjustment means and the strip 2 are made in one-piece, and possibly formed from the same material.

Furthermore, the outer end 4 of the strip 2 is herein curved perpendicularly to form an appendix 9. The appendix 9 serves as an attach point, and allows receiving efforts. Preferably, it is substantially rigid, i.e. at least more rigid than the strip 2 and/or the elongate flexible elements 5, 15 to minimise its influence on the stiffness of the strip 2.

In the first embodiment, each elongate flexible element 5, 15 is a unique flexible blade 13, 18 connecting the appendix 9 to the fixed support 11. The unique first flexible blade 13 is arranged in line with the appendix 9, whereas the unique second flexible blade 13 is arranged in a direction substantially perpendicular to the appendix 9.

Thus, the unique first flexible blade 13 is arranged according to a radial direction, preferably passing through the centre of the spiral spring 1, in the rest position of the spiral spring 1, whereas the second flexible blade 18 is arranged in a direction tangential to the strip 2.

In the second embodiment of FIG. 2, each elongate flexible element 5, 15 includes a pair of main blades 23, 25 extending from the appendix 9 up to the fixed support 11. The main blades 23, 25 of each pair deviate from each other from the appendix 9 up to the fixed support 11 and form, for example, an angle comprised between 10 and 40° therebetween.

The spiral spring 1 further includes prestressing means 6 for applying on at least one of the flexible elements 5, 15, preferably the two flexible elements 5, 15 at least two different efforts. For example, the two efforts are imparted on the first flexible element 5.

Preferably, the two efforts are a tensile-compressive longitudinal force $F_L$, and an orthogonal force $F_T$, which are variable. The longitudinal force $F_L$ is directed according to the longitudinal direction of the first flexible element 5, whereas the orthogonal force $F_T$, is directed according to a direction perpendicular to the longitudinal direction of the first flexible element 5, the two forces preferably belonging to the plane of the spiral spring 1, 10. Thus, it is possible to modify the stiffness of the first flexible element 5, and thus adjust running of the spiral spring 1, 10, in particular to improve the accuracy of running of the movement.

The first flexible element 5 is acted upon to modify its stiffness without directly acting on the strip 2. However, during oscillations, the end 4 of the strip 2 may be movable.

In addition, the longitudinal $F_L$ and orthogonal $F_T$ forces are continuously adjustable by the prestressing means 6. In other words, the forces $F_L$ and $F_T$ are not restricted to discrete values. Thus, it is possible to finely adjust the stiffness of the flexible element 5 with great accuracy.

Furthermore, the prestressing means 6 are configured to modify the stiffness of the second flexible element 15.

Indeed, the first effort further exerts a first force directed substantially in a direction substantially orthogonal to the longitudinal direction of the second elongate flexible element 15. Since the two flexible elements 5, 15 are arranged perpendicularly to one another, a longitudinal force applied on one of the elongate flexible elements 5, 15, generates a substantially orthogonal force applied on the other flexible element.

Similarly, the second effort further exerts a second tensile/compressive force directed substantially in the longitudinal diction of the second elongate flexible element 15.

To apply these adjustable forces, the prestressing means 6 comprise two means for applying a force on the elongate flexible elements 5, 15.

Each of the application means comprises two secondary flexible blades 12, 13. Each secondary flexible blade 12, 13 is arranged in line with the elongate flexible element 5, 15, and is fastened at the other side of the appendix 9.

The two secondary flexible blades 12, 13 are arranged perpendicularly to one another.

Alternatively, the secondary blades 12, 13, may be replaced with conventional springs.

Each secondary flexible blade 12, 13 is provided with a rigid body 14, 16 at the free end. The rigid body 14, 16 enables the application of a variable force on the secondary flexible body 12, 13 in order to adjust the force transmitted to the elongate flexible element 5, 15.

By moving the rigid bodies 14, 16, a variable longitudinal force F_L and a variable orthogonal force F_T are applied on the appendix 9, according to each direction of movement of each rigid body 14, 16. Thus, the stiffness of the elongate flexible elements 5, 15 is modified. By moving the rigid bodies 14, 16, the value of the force exerted on the unique flexible blade 15 is modified.

The prestressing means 6 further include variable support means on the rigid body 14, 16. By actuating the support means, the rigid body 14, 16 moves, so that the secondary flexible blade 12, 13 is more or less bent, and consequently transmits a more or less substantial force on the elongate flexible element 5, 15. Thus, the rigidity of the elongate flexible element 5, 15 is modified, so that running of the spiral spring is modified, and could be adjusted.

For example, the variable support means consist of a screw 24 in contact with the rigid body 14, 16, and arranged longitudinally according to the direction of the secondary flexible blade 12, 13. Thus, by moving the screw 24, the secondary flexible blades 12, 13 exert a more or less substantial force on the appendix 9, and therefore on the elongate flexible elements 5, 15.

Alternatively, the variable support means comprise a spring fastened at one side to the rigid body, and a movable body arranged at the other end of the spring. Thus, by moving the movable body, the spring exerts a more or less substantial force on the secondary flexible blade.

In another variant, the prestressing means include a first magnet arranged on the rigid body, and a second movable magnet arranged at a distance from the rigid body. Thus, by modifying the distance of the second magnet with respect to the first magnet, the force applied on the secondary flexible blade is modified.

Alternatively, it is possible to use a pivoting lever assembled to the rigid body by a first end, the other end being free and serving as a means for actuating the lever by moving said free end.

Preferably, the prestressing means are configured to enable an adjustment of the two efforts, herein the two longitudinal tensile/compressive forces at different intensities. Thus, a first application means enables an adjustment in a wider setting range, and a second application means enables an adjustment in a finer setting range.

To this end, the secondary flexible blades 12, 13 have, for example, different sections or lengths. Alternatively, the variable support means on the rigid body 14, 16 are configured to obtain different setting ranges, for example with a different screw pitch.

The invention also relates to a horological movement comprising such a spiral spring. In particular, the spiral spring is used to actuate the movement of a balance.

Of course, the invention is not limited to the embodiments described with reference to the figures and variants could be considered without departing from the scope of the invention.

As regards the longitudinal element, the flexible blades described in the different embodiments of the spiral spring, may be continuous flexible blades, as is generally the case in the figures, or blades with rigid sections and flexible necks connecting the sections.

Furthermore, the unique flexible blade may be directed according to directions other than radial and orthogonal with respect to the spiral spring. Thus, it may be directed according to any direction comprised between the radial and orthogonal directions.

The invention claimed is:

1. A spiral spring for a horological resonator mechanism, the spiral spring (1, 10) comprising a flexible strip (2) coiled on itself into several turns, the strip (2) having a predefined stiffness, the spiral spring (1, 10) including means for adjusting tensile/compressive forces acting on the spiral spring, wherein the adjustment means include a first elongate flexible element (5), and a second elongate flexible element (15) arranged in series with the strip (2), each elongate flexible element (5, 15) connecting the same end (4, 9) of said strip (2) to a fixed support (11, 14), so as to add an additional stiffness to the spiral spring, each elongate flexible element (5) having a stiffness higher than that of the strip (2), the adjustment means including prestressing means (6) for applying at least two different adjustable forces, the two different adjustable forces being of the tensile/compressive forces acting on the spiral spring and applied on the first elongate flexible element (5) so as to make the stiffness of the first elongate flexible element (5) vary according to the prestress level.

2. The spiral spring according to claim 1, wherein a first of the two different adjustable forces is imparted by, of the tensile/compressive forces, a first tensile/compressive force directed in the longitudinal direction $F_L$ of the first elongate flexible element (5).

3. The spiral spring according to claim 1, wherein a first of the two different adjustable forces further is exerted and directed in a direction orthogonal to the longitudinal direction of the second elongate flexible element (15).

4. The spiral spring according to claim 1, wherein a second of the two different adjustable forces is imparted and directed in a direction orthogonal $F_T$ to the longitudinal direction of the first elongate flexible element (5).

5. The spiral spring according to claim 4, wherein the second of the two different adjustable forces is, as a second tensile/compressive force of the tensile/compressive forces, directed in the longitudinal direction of the second elongate flexible element (15).

6. The spiral spring according to claim 1, wherein each of the first (5) and second (15) elongate flexible elements includes a unique flexible blade (13, 18).

7. The spiral spring according to claim 1, wherein each of the first (5) and second (15) elongate flexible elements includes a pair of main flexible blades (23, 25).

8. The spiral spring according to claim 1, wherein the first (5) and second (15) elongate flexible elements are perpendicular to one another.

9. The spiral spring according to claim 1, wherein the first flexible element (5) is arranged in a radial direction of the spiral spring (1, 10).

10. The spiral spring according to claim 1, wherein the second flexible element (15) is arranged in a direction tangential to the spiral spring (1, 10).

11. The spiral spring according to claim 1, wherein the prestressing means (6) comprise two secondary flexible blades (12, 13) connected at an end (4), each secondary flexible blade (12, 13) being arranged in line with one of the elongate flexible elements (5, 15).

12. The spiral spring according to claim 11, wherein the prestressing means (6) include two rigid bodies (14, 16) each arranged at the end of each secondary flexible blade (12, 13).

13. The spiral spring according to claim 12, wherein the prestressing means (6) include variable support means on each rigid body (14, 16).

14. The spiral spring according to claim 1, wherein the two different adjustable forces are continuously adjustable by the prestressing means (6).

15. The spiral spring according to claim 1, wherein the first (5) and second (15) flexible elements are arranged at an outer end (4) of the strip (2).

16. The spiral spring according to claim 1, wherein the prestressing means (6) are configured to enable an adjustment of the two different adjustable forces at different intensities.

17. A rotary resonator mechanism, in particular for a horological movement, including an oscillating mass and comprising a spiral spring (1, 10) according to claim 1.

18. The spiral spring according to claim 1, wherein a longitudinal axis of the first elongate flexible element (5) is arranged orthogonal to a longitudinal axis of the second elongate flexible element (15).

19. The spiral spring according to claim 18, wherein the prestressing means comprises screws (24), and the screws (24) comprise a first screw and a second screw, a longitudinal axis of the first screw is arranged orthogonal to the longitudinal axis of the second elongate flexible element (15), and a longitudinal axis of the second screw is arranged orthogonal to the longitudinal axis of the first elongate flexible element (5).

* * * * *